US012330858B2

(12) United States Patent
Frazier

(10) Patent No.: US 12,330,858 B2
(45) Date of Patent: Jun. 17, 2025

(54) CLEANUP KITS INCLUDING BOTH WET WIPES AND DRY WIPES

(71) Applicant: UNITED LABORATORIES, INC., St. Charles, IL (US)

(72) Inventor: Eric D. Frazier, Marengo, IL (US)

(73) Assignee: UNITED LABORATORIES, INC., St. Charles, IL (US)

( * ) Notice: Subject to any disclaimer, the term of this patent is extended or adjusted under 35 U.S.C. 154(b) by 0 days.

(21) Appl. No.: 18/637,334

(22) Filed: Apr. 16, 2024

(65) Prior Publication Data

US 2024/0262605 A1 Aug. 8, 2024

Related U.S. Application Data

(62) Division of application No. 17/443,173, filed on Jul. 21, 2021, now Pat. No. 11,987,439.

(Continued)

(51) Int. Cl.
| | |
|---|---|
| B65B 17/02 | (2006.01) |
| A01N 25/34 | (2006.01) |
| A47K 10/38 | (2006.01) |
| B65B 53/00 | (2006.01) |
| B65B 53/02 | (2006.01) |
| B65B 61/14 | (2006.01) |
| B65D 25/28 | (2006.01) |
| B65D 43/16 | (2006.01) |
| B65D 69/00 | (2006.01) |

(Continued)

(52) U.S. Cl.
CPC ......... *B65D 83/0805* (2013.01); *A01N 25/34* (2013.01); *A47K 10/38* (2013.01); *B65B 53/00* (2013.01); *B65B 61/14* (2013.01); *B65D 25/2873* (2013.01); *B65D 43/169* (2013.01); *B65D 75/002* (2013.01); *A01P 1/00* (2021.08); *A47K 2010/3233* (2013.01); *A47K 2010/3266* (2013.01)

(58) Field of Classification Search
CPC ............ B65D 83/0805; B65D 25/2873; B65D 43/169; B65D 75/002; B65B 53/00; B65B 61/14; A01N 25/34; A47K 10/38; A47K 2010/3233; A47K 2010/3266; A01P 1/00
USPC ........ 206/162, 225, 233, 494, 581; 294/140, 294/149, 164
See application file for complete search history.

(56) References Cited

U.S. PATENT DOCUMENTS

| | | | |
|---|---|---|---|
| 3,031,359 A | 4/1962 | Lawrence et al. | |
| 5,803,249 A * | 9/1998 | Harsanyi, Jr. ...... | A47K 10/3818 206/812 |

(Continued)

*Primary Examiner* — Luan K Bui
(74) *Attorney, Agent, or Firm* — MARSHALL, GERSTEIN & BORUN LLP

(57) ABSTRACT

Cleanup kits including both wet wipes and dry wipes. In accordance with a first example, a cleanup kit includes a first dispenser containing wet wipes and having a first accessible opening to allow the wet wipes to be dispensed therethrough. The cleanup kit also includes a second dispenser containing dry wipes and having a second accessible opening to allow the dry wipes to be dispensed therethrough. The cleanup kit also includes a carrying handle projecting upwardly from the first and second dispensers and heat sealed to both the first dispenser and the second dispenser to couple the first and second dispensers together. The first and second dispensers are discrete dispensers having separate housings and separate lids.

10 Claims, 2 Drawing Sheets

Related U.S. Application Data

(60) Provisional application No. 63/054,608, filed on Jul. 21, 2020.

(51) Int. Cl.
    *B65D 75/00*     (2006.01)
    *B65D 83/08*     (2006.01)
    *A01P 1/00*     (2006.01)
    *A47K 10/32*     (2006.01)

(56) References Cited

U.S. PATENT DOCUMENTS

| | | |
|---|---|---|
| 6,186,730 B1 | 2/2001 | Place |
| 6,899,250 B2 | 5/2005 | FitzSimons et al. |
| 7,354,598 B2 | 4/2008 | Masting |
| 7,380,687 B2 | 6/2008 | FitzSimons et al. |
| 7,559,434 B2 | 7/2009 | Masting |
| 7,621,397 B2 | 11/2009 | Boudrie et al. |
| 10,040,606 B2 | 8/2018 | Moore |
| 2001/0035416 A1 | 11/2001 | Dodson |
| 2005/0051568 A1 | 3/2005 | Young et al. |
| 2006/0283873 A1 | 12/2006 | Bostic |
| 2007/0215506 A1 | 9/2007 | Hartness et al. |
| 2011/0127283 A1* | 6/2011 | Delucia ............. B65D 81/3876 220/754 |
| 2014/0076916 A1 | 3/2014 | Boyce |
| 2014/0238881 A1* | 8/2014 | Stuhlmann ......... B65D 71/0003 206/427 |
| 2018/0312299 A1 | 11/2018 | Moore |
| 2020/0262638 A1 | 8/2020 | Lang |

\* cited by examiner

CLEANUP KITS INCLUDING BOTH WET WIPES AND DRY WIPES

CROSS REFERENCE TO RELATED APPLICATION

The present application is a divisional of U.S. patent application Ser. No. 17/443,173, entitled "CLEANUP KITS INCLUDING BOTH WET WIPES AND DRY WIPES," and filed Jul. 21, 2021, which claims the benefit under 35 U.S.C. § 119(e) of U.S. Provisional Patent Application Ser. No. 63/054,608, filed Jul. 21, 2020, the entire disclosures of which are incorporated herein by reference.

FIELD OF THE DISCLOSURE

The present disclosure relates generally to cleanup kits and, in particular, to cleanup kits including both wet wipes and dry wipes.

BACKGROUND

Disposable wet wipes may be impregnated with a cleaning solution and may be used to clean surfaces. In some instances, a disposable dry wipe may be used in combination with the wet wipe to remove spillage and prepare the surface for further cleaning. Wet wipes are often stored in a resealable container and dry wipes are typically stored on a roll. Thus, when cleaning spillage, an individual may be required to separately locate and bring both wet wipes and dry wipes to the location to be cleaned.

SUMMARY

The disclosed examples relate to cleanup kits including both wet wipes and dry wipes that advantageously facilitate cleanup by decreasing the number of separate items that an individual often brings to clean spillage. As a result, the disclosed cleanup kits provide a convenient, portable, and easy-to-use approach to cleaning that may reduce an amount of time an individual spends locating separate cleaning items and thus the amount of time spent between starting and ending a cleaning event. The dry wipes of the cleanup kits may be clean, lint-free drying wipes that capture loosened dirt particles. Moreover, using both the wet and dry wipes as disclosed does not require a separate cleaning solution(s) to be sprayed onto the wipes and/or poured onto a location to be cleaned. Thus, the cleanup kits reduce product waste and/or overuse and avoid hand fatigue and/or over-spraying associated with trigger sprayer use.

In accordance with a first example, a cleanup kit includes a first dispenser containing wet wipes and having a first accessible opening to allow the wet wipes to be dispensed therethrough. The cleanup kit also includes a second dispenser containing dry wipes and having a second accessible opening to allow the dry wipes to be dispensed therethrough. The cleanup kit also includes a carrying handle projecting upwardly from the first and second dispensers and heat sealed to both the first dispenser and the second dispenser to couple the first and second dispensers together. The first and second dispensers are discrete dispensers having separate housings and separate lids.

In accordance with a second example, a method includes positioning a first dispenser containing wet wipes adjacent a second dispenser containing dry wipes. The method also includes heat sealing a carrying handle to both the first dispenser and the second dispenser to couple the first and second dispensers together such that the carrying handle projects upwardly from and couples the first and second dispensers.

In further accordance with the foregoing first and/or second examples, an apparatus or method may further include any one or more of the following:

In accordance with one example, each of the first dispenser and the second dispenser is cylindrical and thus has a curved exterior facing surface. The curved exterior facing surfaces of the first and second dispensers engage along a height of the first and second dispensers, whether substantially continuously, at one location, or at two or more locations, to form an interface, and the carrying handle is heat sealed at the interface between the first and second dispensers.

In accordance with another example, the carrying handle extends over an end of each of the first and second dispensers and along the interface.

In accordance with another example, the first dispenser and the second dispenser have axes that are substantially parallel to one another.

In accordance with another example, the carrying handle is U-shaped when heat sealed to the first and second dispensers.

In accordance with another example, the carrying handle is flexible.

In accordance with another example, the carrying handle is a plastic strip.

In accordance with another example, the wet wipes are impregnated with a cleaning solution.

In accordance with another example, the cleaning solution includes at least one of a glass cleaner, a hard surface cleaner, or a bathroom cleaner.

In accordance with another example, the cleaning solution is an anti-viral solution, an anti-bacterial solution, or an anti-microbial solution.

In accordance with another example, the cleanup kit also includes shrink wrap surrounding the first dispenser and the second dispenser to further couple the first and second dispensers together.

In accordance with another example, the carrying handle has distal ends that are heat sealed to the first and second dispensers. The distal ends are non-rotatable relative to the first and second dispensers.

In accordance with another example, positioning the first dispenser containing wet wipes adjacent the second dispenser containing dry wipes includes engaging the first and second dispensers along a height of the first and second dispensers, thereby forming an interface.

In accordance with another example, the first and second dispensers are discrete dispensers having separate housings and separate lids.

In accordance with another example, heat sealing the carrying handle to both the first dispenser and the second dispenser includes extending the carrying handle over an end of each of the first and second dispensers.

In accordance with another example, heat sealing the carrying handle to both the first dispenser and the second dispenser includes heat sealing the carrying handle at the interface between the first and second dispensers.

In accordance with another example, the carrying handle is U-shaped after being heat sealed at the interface to couple the first and second dispensers together.

In accordance with another example, the carrying handle is flexible.

In accordance with another example, the method further includes shrink wrapping the first and second dispensers together.

DETAILED DESCRIPTION

Figure 1:
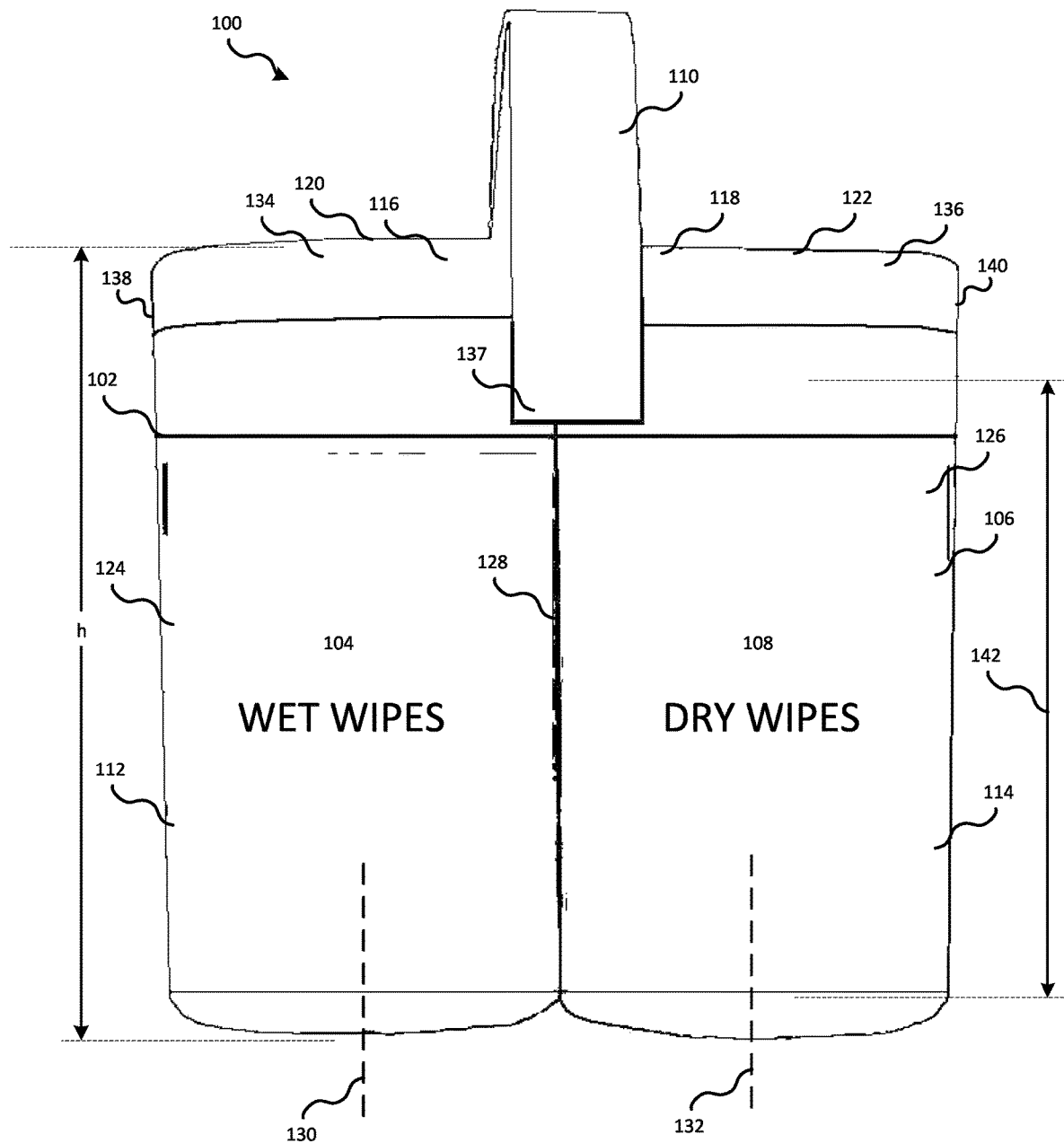
FIG. 1 illustrates a cleanup kit assembled in accordance with a first disclosed example of the present invention.

Referring now to the drawings, FIG. 1 illustrates a cleanup kit 100 assembled in accordance with a first disclosed example of the present invention. In the disclosed example, the cleanup kit 100 includes a first dispenser 102 containing wet wipes 104, a second dispenser 106 containing dry wipes 108, and a carrying handle 110 heat sealed to both the first dispenser 102 and the second dispenser 106 to couple the first and second dispensers 102, 106 together. In the example shown, the carrying handle 110 projects upwardly from the first and second dispensers 102, 106 substantially co-axially along an interface 128 between the first and second containers 102, 106. However, in other refinements, the carrying handle 110 may be differently arranged than illustrated in FIG. 1, provided that it is still coupled to both of the first and second dispensers 102, 106.

Advantageously, the carrying handle 110 provides both a convenient way for an individual to transport the cleanup kit 100 to and from a cleaning task and couples the first and second dispensers 102, 106 together. Moreover, providing the cleanup kit 100 with both the wet and dry wipes 104, 108 allows surfaces to be both cleaned and dried without separately locating the wet wipes and the dry wipes, which often can be stored in different locations within a work environment or a home environment. The wet wipes 104 may be disposable towelettes that are impregnated with a cleaning solution and the dry wipes also may be disposable towelettes which are dry and thus not impregnated with a solution. The wet wipes 104 may be used for disinfecting and/or removing dust, films, soil, and the dry wipes 108 may be used to remove excess moisture, excess cleaning solution, and/or wet spillage.

Referring back to FIG. 1, the first and second dispensers 102, 106 are self-contained and have separate housings 112, 114 and separate lids 116, 118 that may be coupled via snap-fit connections or threaded connections. To allow access to the wipes 104, 108, the first dispenser 102 has a first accessible opening 120 to allow the wet wipes 104 to be dispensed therethrough and the second dispenser 106 has a second accessible opening 122 to allow the dry wipes 108 to be dispensed therethrough. Each of these openings 120, 122 is in communication with a respective contents of the first and second dispensers 102, 106, respectively. Because the dispensers 102, 106 are self-contained, for example, the opening 120 is not in communication with the contents of the second dispenser 106 and the opening 122 is not in communication with the contents of the first dispenser 102.

In the example shown, the dispensers 102, 106 are cylindrical and have curved surfaces 124, 126 that engage at an interface 128 along a height h of the dispensers 102, 106. As such, axes 130, 132 of the dispensers 102, 106 are substantially parallel to one another as well as the interface exemplified in FIG. 1. As set forth herein, the phrase "substantially parallel" means within about 5 degrees of parallel and/or accounts for manufacturing tolerances. While the dispensers 102, 106 are shown being cylindrical, the dispensers 102, 106 may be a cuboid or may be another shape, for example, the dispensers 102, 106 may have substantially interlocking/complementary shapes such as zigzag angles, protruding/receding horizontal projecting shelves, etc., as long as the dispensers 102, 106 have surfaces capable of engagement, either continuously or at one or more discrete locations, along the interface 128.

Regardless of the shape of the dispensers 102, 106, the carrying handle 110 may be heat sealed at the interface 128 between the dispensers 102, 106 such that the carrying handle 110 extends over an end 134, 136 of each of dispensers 102, 106 and along the interface 128. Specifically, the carrying handle 110 includes distal ends 137 that are heat sealed to the first and second dispensers 102, 106 such that the distal ends 137 are not rotatable relative to the first and second dispensers 102, 106. Heat sealing the carrying handle 110 along the interface 128 has been found to increase the structural integrity of the cleanup kit 100, particularly relative to other possible locations for the carrying handle 110 (i.e., dispensers 102, 106 have been found to be more easily separable from one another when the carrying handle 110 is not heat sealed along the interface 128). The carrying handle 110 may be flexible and/or a plastic strip, allowing facile heat-sealing engagement with the dispensers 102, 106. The carrying handle 110 is therefore not rotatable about an axis. The carrying handle 110 may be U-shaped, thereby providing a comfortable hand-gripping surface when coupled to the dispensers 102, 106.

While the above example discloses the carrying handle 110 being coupled to the dispensers 102, 106 substantially at the interface 128, the carrying handle 110 may be coupled in a different location. For example, the carrying handle 110 may be coupled to sides 138, 140 of the dispensers 102, 106 and extend over the top ends 134, 136 approximately perpendicular to the interface 128. Alternatively, the carrying handle 110 may be coupled to the dispensers 102, 106 and extend over the top ends 134, 136 in a plane substantially defined by the curved surfaces 124, 126 which are front facing surfaces as illustrated in FIG. 1. Other arrangements for the carrying handle 110 may prove suitable. Additionally, while the carrying handle 110 is disclosed as being heat sealed to the dispensers 102, 106, the carrying handle may alternatively be coupled to one or both of the dispensers 102, 106 using adhesive. Moreover, while the carrying handle 110 is shown coupling the dispensers 102, 106, the dispensers 102, 106 may additionally or alternatively be coupled using shrink wrap that surrounds the dispensers 102, 106. In such examples, the carrying handle 110 may be coupled to the shrink wrap and/or directly to the housing 112, 114, but preferably the carrying handle 110 is coupled to the housing 112, 114. The shrink wrap may surround a portion 142 of the dispensers 102, 106, which is shown as being a majority of the height h. However, the shrink wrap may surround more or less of the dispensers 102, 106 or may be omitted as described above.

As disclosed above, the wet wipes 104 may be impregnated with a cleaning solution, for example, containing ammonia, bleach, acidic cleaning agents, surfactants, degreaser cleaning agents, etc. The cleaning solution may include a glass cleaner, a hard surface cleaner, and/or a bathroom cleaner. The cleaning solution may additionally or alternatively include an anti-viral solution, an anti-bacterial solution, or an anti-microbial solution. Advantageously, the wet wipes 104 may be used to clean dry-erase marker, finger prints, grease, lipstick, oils, and/or smoke from different hard surfaces including: windows, mirrors, windshields, whiteboards, ceramic tile, aluminum, cabinets, plastics, countertops, appliance tops, porcelain bath fixtures, stainless steel, table tops, etc. The dry wipes 108 may be used to prepare the surface for cleaning with the wet wipes 104 or to clean smearing and/or residual films left after cleaning with the wet wipes 104. Of course, the wipes 104, 108 may be used to clean other types of surfaces and/or other cleaning solutions may prove suitable.

Figure 2:
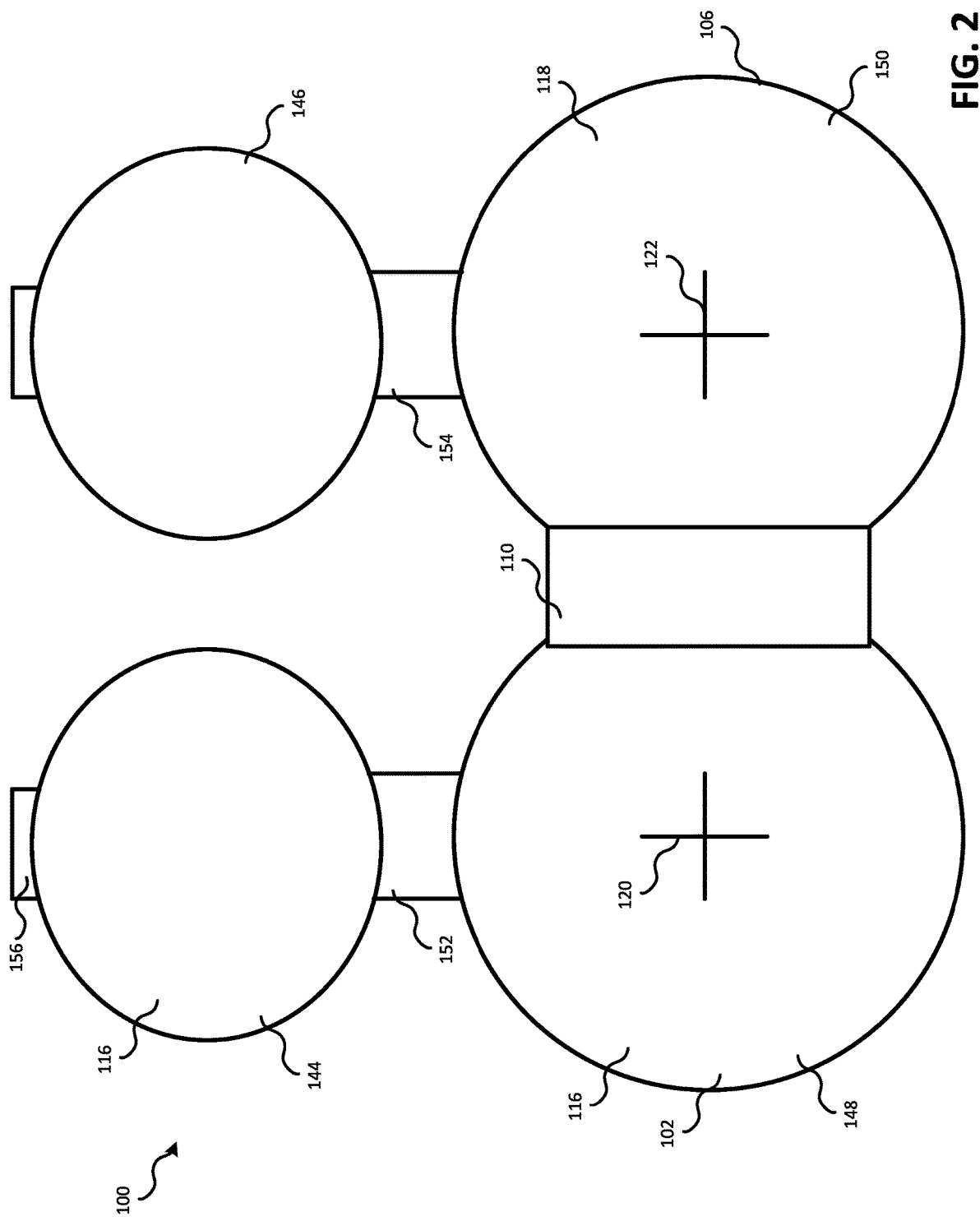
FIG. 2 is a top plan view of the cleanup kit of FIG. 1.

FIG. 2 is a top plan view of the cleanup kit 100 of FIG. 1. In the example shown, the lids 116, 118 include cover flaps 144, 146 and lid bases 148, 150 that are respectively attached to one another by living hinges 152, 154. The cover flaps 144, 146 are moveable between an open position (shown) that provides access to the openings 120, 122 and a closed position that covers the openings 120, 122. The cover flaps 144, 146 may be secured to the lid bases 148, 150 via a snap-fit connection to substantially prevent evaporation of the cleaning solution and/or to prevent ingress of debris. However, the cover flaps 144, 146 may be secured to the lid bases 148, 150 in other ways as well. The cover flaps 144, 146 are shown including tabs 156 to assist in opening the cover flaps 144, 146. However, the cover flaps 144, 146 and/or the tabs 156 may be omitted. While the lids 116, 118 are shown including the openings 120, 122, the housings 112, 114 may include the openings 120, 122.

While the handle 110 is shown in the view of FIG. 2, it should be understood that the handle projects above and thus does not interconnect the housings 112, 114.

Although the foregoing text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Further, while several examples have been disclosed herein, any features from any examples may be combined with or replaced by other features from other examples. Moreover, while several examples have been disclosed herein, changes may be made to the disclosed examples without departing from the scope of the claims.

What is claimed is:

1. A method, comprising:
providing a self-contained first dispenser having a first housing, the first dispenser containing wet wipes;
providing a self-contained second dispenser having a second housing, the second dispenser containing dry wipes;
positioning the first dispenser adjacent the second dispenser;
arranging the first housing and the second housing to engage at an interface along a height of the first dispenser and the second dispenser;
heat sealing a first end of a carrying handle to both the first housing and the second housing; and
heat sealing a second end of a carrying handle to both the first housing and the second housing to couple the first and second dispensers together such that the carrying handle projects upwardly from the first and second dispensers.

2. The method of claim 1, wherein the first and second dispensers have separate lids.

3. The method of claim 1, wherein heat sealing the carrying handle to both the first dispenser and the second dispenser includes extending the carrying handle over an end of each of the first and second dispensers.

4. The method of claim 1, wherein heat sealing the carrying handle to both the first dispenser and the second dispenser includes heat sealing the carrying handle at an interface between the first and second dispensers.

5. The method of claim 1, wherein the carrying handle is U-shaped when heat sealed to the first and second dispensers.

6. The method of claim 1, wherein the carrying handle is flexible.

7. The method of claim 1, further comprising shrink wrapping the first and second dispensers together.

8. The method of claim 1, wherein the first and second housings are cylindrical in shape.

9. The method of claim 8, wherein the interface between the first housing and the second housing forms a line.

10. The method of claim 1, wherein the carrying handle projects upwardly from the first and second dispensers and substantially co-axially along the interface.

* * * * *